United States Patent [19]

Ishiguro

[11] Patent Number: 5,012,328

[45] Date of Patent: Apr. 30, 1991

[54] TELEVISION RECEIVER WHICH INCLUDES A MEMORY FOR STORING A FIELD IMAGE WHICH CAN BE PERIODICALLY DISPLAYED AS A STILL PICTURE

[75] Inventor: Satoshi Ishiguro, Kanagawa, Japan

[73] Assignee: Sony Corporation, Tokyo, Japan

[21] Appl. No.: 353,768

[22] Filed: May 18, 1989

[30] Foreign Application Priority Data

May 24, 1988 [JP] Japan ................................ 63-126608
May 25, 1988 [JP] Japan ................................ 63-127889

[51] Int. Cl.$^5$ ...................... H04N 9/74; H04N 5/14; H04N 5/262
[52] U.S. Cl. ................................ 358/22; 358/183; 358/160; 360/10.1
[58] Field of Search ............... 358/181, 182, 183, 140, 358/141, 22, 160; 360/10.1

[56] References Cited

U.S. PATENT DOCUMENTS

| 4,179,704 | 12/1979 | Moore et al. ...................... 358/105 |
| 4,272,787 | 6/1981 | Michael et al. ..................... 360/10.1 |
| 4,430,675 | 2/1984 | Fujime ................................. 360/10.1 |
| 4,558,377 | 12/1985 | Collins et al. ...................... 360/10.1 |
| 4,698,682 | 10/1987 | Astle ..................................... 358/22 |
| 4,701,785 | 10/1987 | Willis ................................... 358/22 |
| 4,774,582 | 9/1988 | Hakamada et al. ................. 358/183 |
| 4,777,531 | 10/1988 | Hakamada et al. .................. 358/22 |
| 4,864,428 | 9/1989 | Kanamaru ......................... 360/10.1 |

FOREIGN PATENT DOCUMENTS 1564441 4/1980 United Kingdom .

OTHER PUBLICATIONS

"Integrated Digital IDTV Receive with Features'-'IEEE Transaction on Consumer Electronics, vol. 34, No. 3, Aug. 1988.
"A Field Store System with Single IMBit Field Memory", by Miyaguchi et al, Copyright 1988, IEEE Manuscript received Jun. 10, 1988.
"Storing TV Pictures in Chips", Television Jul. 1988.
"IDTV System High Picture Quality, S-Digital TV", by Sunada et al, NEC Research and Development No. 90, of Jul. 1988.

Primary Examiner—John K. Peng
Attorney, Agent, or Firm—Hill, Van Santen, Steadman & Simpson

[57] ABSTRACT

A television receiver and apparatus which includes a field memory which is capable of storing a video signal during a first period of time and includes a control for controlling the writing of the video signal in the image and also for displaying the stored video signal on the video screen intermittently.

7 Claims, 4 Drawing Sheets

TELEVISION RECEIVER WHICH INCLUDES A MEMORY FOR STORING A FIELD IMAGE WHICH CAN BE PERIODICALLY DISPLAYED AS A STILL PICTURE

BACKGROUND OF THE INVENTION

1. Field of the Invention

The present invention relates generally to television receivers and, more particularly, is directed to a television apparatus which displays an output image of a video signal as a strobe action which means that a still image is being sequentially changed.

2. Description of the Prior Art

A television receiver that can display an output image of a video signal as a strobe action has been known previously. In this case, to display an output image as a strobe action is to display the output image of the video signal in such a manner that a still image is being sequentially changed. Such prior art television receiver includes a memory or a video RAM (random access memory) capable of storing a field time (or frame time) of a video signal, in which in the strobe display mode, one field time of an input video signal is stored in the memory within one field period. Then, the writing of that video signal is interrupted, the video signal stored in the memory is repeatedly read over a predetermined period of time, for example, 8 field periods and the video signals of one field period repeatedly read are supplied to and displayed on a cathode ray tube (CRT). Thereafter, the writing of that video signal in the memory is interrupted and one field time of the input video signal is similarly written in the memory within one field period. The above-mentioned operation is repeatedly carried out, whereby the strobe display is performed on the screen of the cathode ray tube in which the image is changed at every 9-field period.

For the strobe display, one proposal is that the strobe display is effected on the whole screen of the cathode ray tube on the basis of a video signal of a certain channel. Another proposal is that the screen of the cathode ray tube is divided to provide two screens, wherein an image on the basis of a video signal of a certain channel is normally displayed on one divided screen, whereas an image on the basis of a video signal of other channel is displayed on the other divided screen in a strobe-display-fashion. Then, the screen for standard display and the screen for strobe display are exchanged with each other at every predetermine period of time.

Writing one field time of an input video signal in the memory within one field period of time, thereafter stopping the writing of the input video signal, reading image data or contents stored in the memory over a desired field period repeatedly and supplying the thus read image data to a cathode ray tube, it becomes possible to display an image on the cathode ray tube as a still image which is one of the strobe display.

In the prior-art television receiver, when the input video signal is selected, or when the channel selection of the received television signal is effected or when the received input video signal and the external input video signals from a video tape recorder, a video disk reproducing apparatus and the like are selected, if the selection period of the input video signal overlaps the writing period of the video signal in the above-mentioned memory, then a video signal disturbed by the shifted synchronization is written in the memory. Thus, when the video signal written in the memory is repeatedly read out and is then fed to the cathode ray tube, then the disturbed image becomes remarkably conspicuous.

To remove the above defects, it is proposed that when the incoming video signal is switched in the period of the strobe display, the strobe display is temporarily stopped or the blanking is applied to the cathode ray tube.

However, it is not preferable that the strobe display be temporarily stopped. Particularly, when the display screen of the cathode ray tube is divided to provide two display screens wherein one video signal of different channels is displayed on one divided display screen in a standard mode, whereas the other video signal is displayed on the other divided display screen in the strobe-action-fashion, or when these video signals are exchanged with each other and are displayed on the two divided display screens, the interruption of the strobe display is not preferable because the interruption of the strobe display presents such a problem that images based on the video signals of different channels are neither displayed on the display screens of the cathode ray tube.

When the incoming video signal is switched in the period of the strobe display, it is not desired that the blanking is applied to the cathode ray tube because the blanking results in the display of image being interrupted.

As earlier noted, according to the prior-art television receiver capable of the strobe display, one field of incoming video signal is written in the memory means over one field period at every 9 (=1+8)-field, or at every odd-numbered field period. Thereafter, the writing of the incoming video signal in the memory means is stopped and one field of the video signal stored in the memory means is repeatedly read out over a time period of 8 fields that are longer than the writing period. Thus, when an incoming video signal is a video signal according to the interlaced scanning system, the odd or even field of the initial video signal written in the memory means at every 9-field period, or at every odd-numbered field is alternately changed in the order of odd, even, odd . . . , so that if the incoming video signal is a video signal of an image having less motion, the image looks as if it were fluctuated in the vertical direction.

OBJECTS AND SUMMARY OF THE INVENTION

Accordingly, it is an object of the present invention to provide an improved television apparatus which can remove the defects encountered with the prior art television apparatus.

More specifically, it is an object of the present invention to provide a television apparatus which can prevent an image displayed in a strobe-action-fashion from being disturbed even when an incoming video signal is switched in the strobe-display state.

Another object of the present invention is to provide a television apparatus which can prevent the display of the image from being interrupted.

Still another object of the present invention is to provide a television apparatus which can prevent the strobe-display from being stopped.

A further object of the present invention is to provide a television apparatus which can prevent an image, displayed in the strobe-action-fashion, from being shifted in the vertical direction.

According to an aspect of the present invention, there is provided a television apparatus comprising:

(a) switching means for selecting a plurality of input video signals;

(b) memory means for storing one of said plurality of input video signals selected by said switching means;

(c) first control means for controlling reading and writing timings of said video signal at said memory means, said first control means generating control signals composed of;

a first control signal for writing a still image of said video signal in said memory means within a first period of time at every predetermined period;

a second control signal for stopping the writing of said still image of said video signal in said memory means; and a third control signal for repeatedly reading said still image from said memory means over a second period of time which is longer than said first period of time;

(d) second control means for controlling said switching means so as to generate a switching motion within said second period of time when said switching means receives a signal for selecting said video signal.

According to another aspect of the present invention, there is provided a television apparatus comprising:

(a) memory means for storing a field image of an input video signal according to the interlaced scanning system;

(b) control means for controlling reading and writing of said video signal in said memory means, said control means generating control signals composed of;

a first control signal for writing said field image of said video signal in said memory means within a first period of time at every period 2nV where n represents 1, 2, 3, ... and V represents a period of the vertical synchronizing signal of said video signal;

a second control signal for stopping the writing of said video signal in said memory means; and a third control signal for repeatedly reading said first image of said video signal from said memory means within a second period of time which is longer than said first period of time.

The above, and other objects, features and advantages of the present invention will become apparent from the following detailed description of illustrative embodiments when read in conjuction with the accompanying drawings, wherein like reference numerals are used to designate the same or similar elements in the several views.

DETAILED DESCRIPTION OF PREFERRED EMBODIMENTS

The present invention will hereinafter be described with reference to the drawings.

Figure 1:
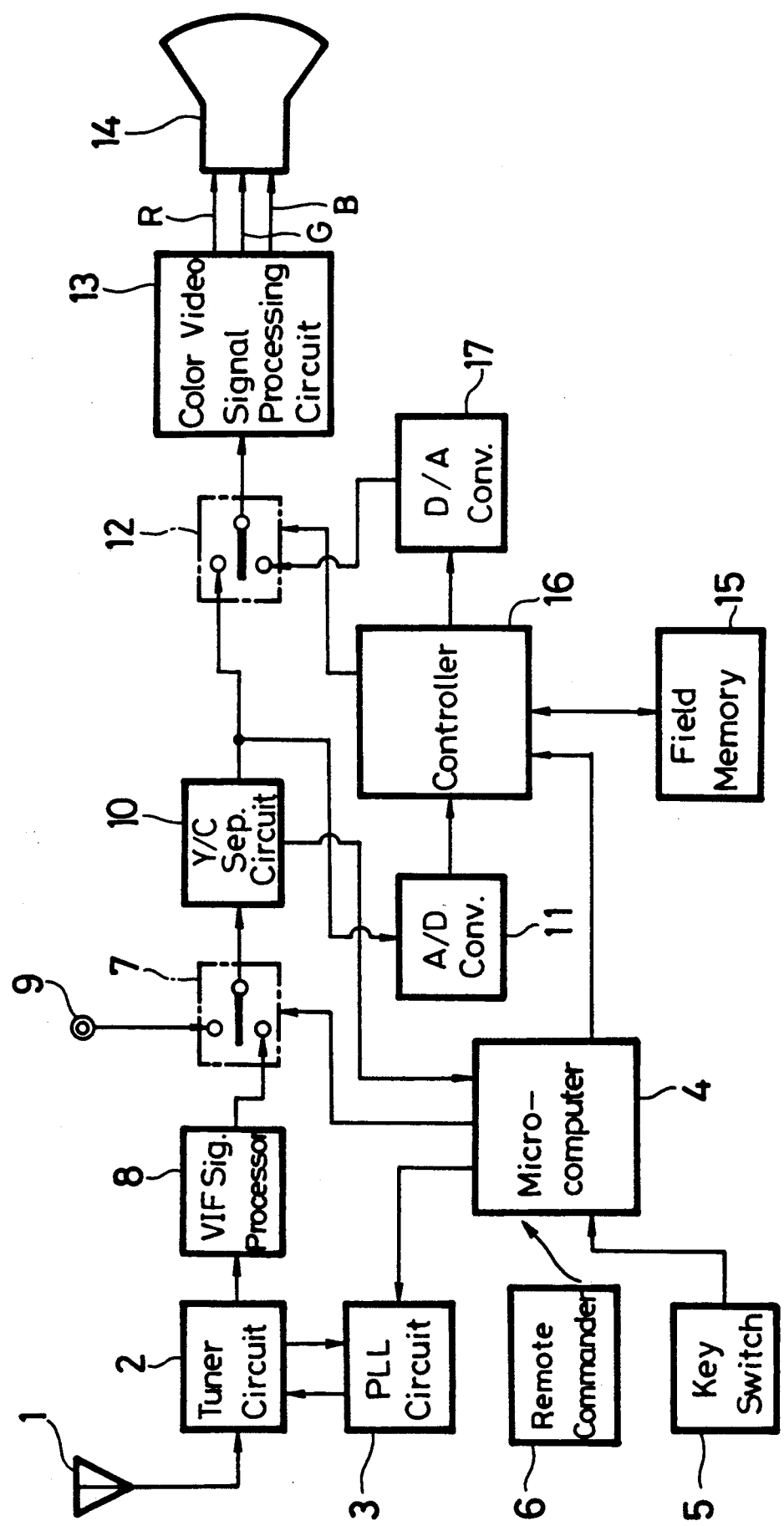
FIG. 1 is a block diagram showing an embodiment of a television apparatus according to the present invention.

Referring to the drawings, and initially to FIG. 1 that illustrates in block form a circuit arrangement of an embodiment of a television apparatus according to the present invention, it will be seen that a television signal received at an antenna 1 is supplied to a tuner circuit 2 which selects a television signal of a desired television channel. Also, in the tuner circuit 2, the thus selected television signal is converted into a video intermediate frequency signal by its frequency converting circuit.

The afore-noted television apparatus utilizes a phase-locked loop (PLL) synthesizer-type channel selecting circuit to perform an automatic fine tuning (AFT) operation when the channel is selected. The automatic fine tuning operation will be described herein-below.

A PLL circuit 3 shown in FIG. 1 is comprised of a pre-frequency divider, a frequency divider, a phase comparator, a reference signal oscillator and a low-pass filter though not shown. A local oscillation signal from a local oscillator (not shown) in the tuner circuit 2 is supplied through the pre-frequency divider and the frequency divider of the PLL circuit 3 to its phase comparator. On the other hand, the reference signal from the reference signal oscillator in the PLL circuit 3 is supplied to the phase comparator. The phase comparator then phase-compares the output of the frequency divider with the reference signal of the reference signal oscillator and supplies the compared output to the tuner circuit 2 through the low-pass filter. Then, the compared output from the phase comparator is used to control the oscillation frequency of the local oscillator.

In the initial channel selection, the automatic fine tuning operation is effected. More specifically, the dividing ratio of the frequency divider in the PLL circuit 3 is determined so as to control the local oscillation frequency of the local oscillator to lie near a frequency corresponding to a standard carrier frequency. The dividing ratio of the frequency divider in the PLL circuit 3 is determined on the basis of previously-stored channel data in a microcomputer 4. Then, the local oscillation frequency is moved upward or downward in a stepwise fashion, namely, the automatic fine tuning is effected. When the television signal is made as a correct one by the automatic fine tuning, offset channel data based on the dividing ratio of that time is stored. In the next channel selection, the thus stored offset channel data in the first channel selection is used to select a desired television channel.

The above-mentioned microcomputer 4 is supplied with various commands such as a channel switching command, a source switching command and the like from a key switch 5 or a remote controller (remote commander) 6. When receiving the channel switching command, the microcomputer 4 supplies a control signal to the PLL circuit 3, whereby the dividing ratio of the frequency divider in the PLL circuit 3 is changed in response to the desired television channel. When receiving the source switching command, the microcomputer 4 supplies a control signal to a first switching circuit 7, whereby the first switching circuit 7 is changed in position in response to an input source selected by the command.

The video intermediate frequency signal from the tuner circuit 2 is supplied to a video intermediate frequency signal processing circuit 8. In the video intermediate frequency signal processing circuit 8, the video intermediate frequency signal is amplified and video-detected and is thereby generated as a composite color video signal. The composite color video signal is supplied to the first switching circuit 7.

There is shown an external video signal input terminal 9 to which there is supplied a composite color video signal from external video apparatus such as a video tape recorder (VTR), a video disk reproducing apparatus and the like. The external composite color video signal from the input terminal 9 is supplied to the first switching circuit 7.

The first switching circuit 7 is controlled by the control signal from the microcomputer 4 on the basis of the source switching command from the remote commander 6 or the key switch 5 so as to selectively switch the color video signal. To be more concrete, the first switching circuit 7 selects either of the composite color video signal from the video intermediate frequency signal processing circuit 8 or the external composite color video signal from the input terminal 9.

The composite color video signal derived from the first switching circuit 7 is supplied to a Y/C separating circuit 10.

The Y/C separating circuit 10 is operative to separate the thus selected composite color video signal into a luminance signal Y and red and blue color difference signals R-Y and B-Y. The luminance signal Y and the color difference signals R-Y and B-Y are fed to an analog-to-digital (A/D) converting circuit 11 and to a second switching circuit 12. Simultaneously, a vertical synchronizing signal separated from the luminance signal Y is supplied to the microcomputer 4.

The luminance signal Y and the color difference signals R-Y and B-Y derived from the Y/C separating circuit 10 are supplied through the second switching circuit 12 to a color video signal processing circuit 13 which demodulates them to three primary color signals R, G and B. The three primary color signals R, G and B are supplied to a color cathode ray tube (color CRT) 14 and are thereby displayed as a color image.

The A/D converting circuit 11 is adapted to convert the luminance signal Y and the color difference signals R-Y and B-Y from the Y/C separating circuit 10 into a digital luminance signal and digital color difference signals. One field (or one frame) of the digital luminance signal and the digital color difference signals from the A/D converting circuit 11 is sequentially written in a field memory (or frame memory) 15 at its address specified by a controller 16. The field memory 15 might be a video-RAM (random access memory). The memory 15 is used on the basis of the command signal from the remote commander 6 or the key switch 5 to display a frame picture in a so-called strobe-action-fashion.

When supplied with the channel switching command for switching the channel of the television signal or the source switching command for switching the input source from the remote commander 6 or the key switch 5, then the microcomputer 4 supplies a control signal to the controller 16.

The controller 16 controls, on the basis of the control signal from the microcomputer 4, timings at which the digital video signal (formed of digital luminance signal and two digital color difference signals) is to be written in or to be read from the memory 15 and also controls the switching operation of the second switching circuit 12. The controller 16 responds to the incoming control signal from the microcomputer 4 to permit the digital video signal to be written in the memory 15 within one field (or one frame) period and then to stop (freeze) the writing operation, the last one field (or last one frame) of the digital video signal is stored in the memory 15. The controller 16 reads the thus stored digital video signal from the memory 15, and supplies the resultant digital video signal to a digital-to-analog (D/A) converting circuit 17, in which it is D/A-converted to provide a luminance signal Y and red and blue color difference signals R-Y and B-Y. The luminance signal Y and the color difference signals R-Y and B-Y are fed to the second switching circuit 12. The controller 16 controls the second switching circuit 12 by its switch change-over signal so that the second switch 12 is changed in position to permit the luminance signal Y and the color difference signals R-Y and B-Y from the D/A converting circuit 17 to be supplied to the color video signal processing circuit 13.

In the color video signal processing circuit 13, the luminance signal Y and the color difference signals R-Y and B-Y are demodulated to the three primary color signals R, G and B, which are supplied to and displayed on the color cathode ray tube 14 in the strobe-action-fashion.

The incoming color video signal is switched during a period of time of, for example, seven fields in which the digital video signal is read out of the memory 15 and is displayed on the color cathode ray tube 14 as a color image formed of, for example, seven still images in the strobe-action-fashion. By this switching operation is meant that if an incoming video signal is a television signal, a frequency of a new channel is locked by the PLL circuit 3 and a new television signal is taken in. Further, when the input source of the composite color video signal is changed, the switch-over between the television signal and the external composite color video signal from the video apparatus is performed. Thus, an image is not disturbed by the inconsistency of the synchronization or a black image made by the blanking is not displayed so that the viewer can handle the television apparatus very comfortably. The afore-noted operation is realized by the software of the microcomputer 4 that controls the memory 15 and the television apparatus can be produced with less software and without increasing the cost.

Then, after the digital video signal stored in the memory 15 is read out over a time period of seven fields, one field of the digital video signal is written in the memory 15 within one field period of time. Thereafter, the writing is stopped and only the digital video signal written is read out of the memory 15 over a period of seven fields, thus resulting in a color image being displayed on the color cathode ray tube 14 as a color image in a strobe-action-fashion.

Figure 2:
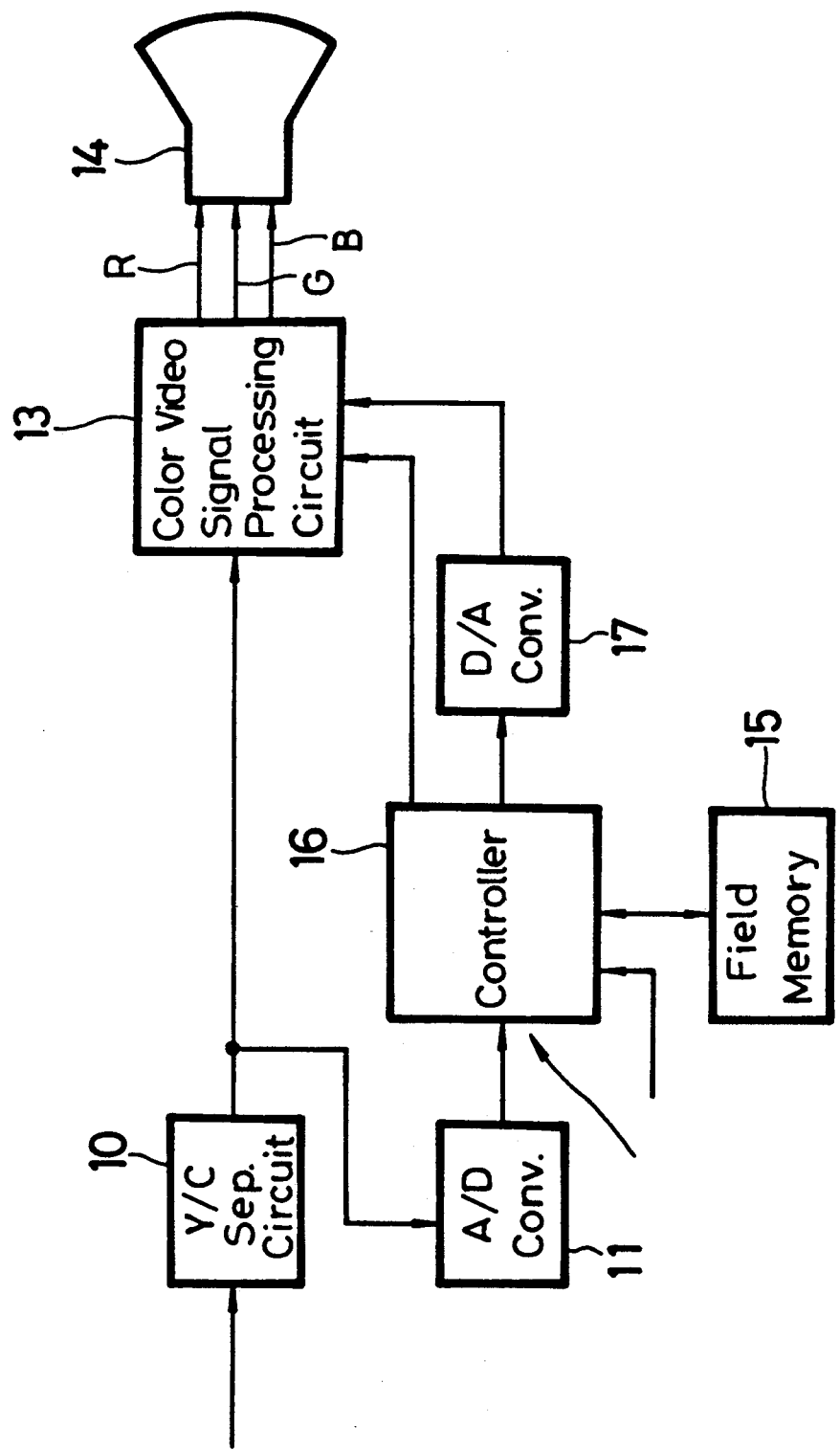
FIG. 2 is a block diagram showing one portion of another embodiment of a television apparatus according to the present invention.

While in the above-mentioned embodiment the second switching circuit 12 selectively produces either the luminance signal Y and the color difference signals R-Y and B-Y from the Y/C separating circuit 10 or the luminance signal Y and the color difference signals R-Y and B-Y from the D/A converting circuit 17, the switch-over of the signals is not limited to the above switch-over but it may be modified as, for example, shown in a block diagram forming FIG. 2. In FIG. 2, like parts corresponding to those of FIG. 1 are marked with the same references and therefore need not be described in detail and the parts not shown in FIG. 2 are substantially the same as those shown in FIG. 1.

Referring to FIG. 2, it will be seen that the output terminal of the D/A converting circuit 17 may be directly connected to the color video signal processing circuit 13. More specifically, when the control signal from the microcomputer 4 is supplied to the controller 16, the writing of the digital video signal in the memory 15 is stopped and the digital video signal stored in the memory 15 is read out and is then converted into an analog video signal by the D/A converting circuit 17. Simultaneously, the controller 16 supplies a control signal to the color video signal processing circuit 13 thereby to apply the blanking thereto. Then, the above-mentioned video signal from the D/A converting circuit 17 may be superimposed upon the video signal to which the blanking was applied, whereby a still image is displayed on the color cathode ray tube 14.

The operation of this embodiment, in particular, the operation in which the incoming video signal is switched, namely, the operation in which the television signal is selected by the tuner circuit 2 or the received video signal and the external video signal are switched by the first switching circuit 7 during a period in which the still image is displayed in a strobe-action-fashion, will be described with reference to the flow chart of FIG. 3.

Figure 3:
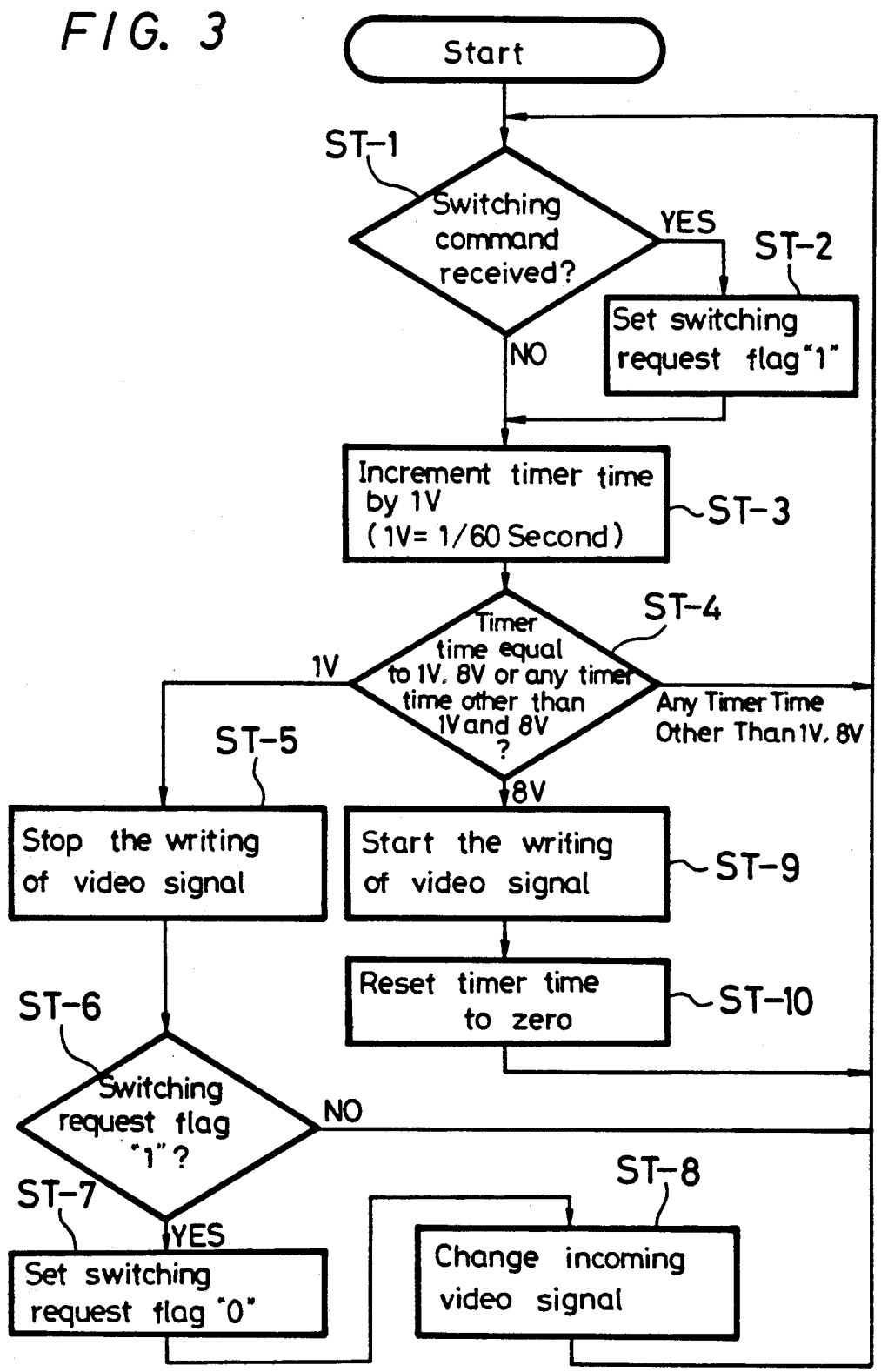
FIG. 3 is a flow chart to which reference will be made in explaining the operation of the embodiment shown in FIG. 1 relating to a first characteristic of the invention.

Referring to FIG. 3, in decision step ST-1 it is determined by judging means of the microcomputer 4 whether or not the key switch 5 or the remote commander 6 issues a command to switch the input video signal. If it is determined that the switching command for the incoming video signal is issued, as represented by a YES at decision step ST-1, the routine proceeds to step ST-2 wherein a switching request flag "1" is set by flag control means of the microcomputer 4. If on the other hand the switching command is not issused by the key switch 5 or the remote commander 6 as represented by a NO at decision step ST-1, the routine directly moves to step ST-3.

At step ST-3, a timer (or timer means) in the microcomputer 4 increments its timer time from 0 by 1V each time 1V has elapsed where 1V is equal to 1/60 second. In the next decision step ST-4, it is determined by timer time detecting means of the microcomputer 4 whether the timer time is 1V, 8V or any timer time other than 1V and 8V. If the timer time is 1V, the routine proceeds to step ST-5. If the timer time is 8V, the routine proceeds to step ST-9, whereas if the timer time is any timer time other than 1V and 8V, the routine returns to step ST-1 and the above-mentioned steps are repeated.

If it is determined at step ST-4 that the timer time is 1V, at step ST-5, command means of the microcomputer 4 commands the controller 16 such that the writing of the digital video signal (digital luminance signal and two digital color difference signals) in the memory 15 should be stopped (frozen) and hence that the reading of the digital video signal from the memory 15 should be started. Then, the routine proceeds to decision step ST-6.

In decision step ST-6, it is determined by flag detecting means of the microcomputer 4 whether the switching request flag "1" is set. If not, the routine returns to step ST-1. If the flag "1" is set, the routine proceeds to step ST-7. In step ST-7, the switching request flag "0" is set by the flag control means of the microcomputer 4. The routine then moves to step ST-8 wherein the command means of the microcomputer 4 commands the PLL circuit 3 or the switch control means of the microcomputer 4 to effect the channel-selection or to change the first switching circuit 7. Then, the routine goes back to step ST-1. It is to be noted that the switching of the incoming video signals is terminated within 7V after the writing of the digital video signal in the memory 15 was completed.

If in decision step ST-4 it is determined that the timer time becomes 8V, the routine proceeds to ST-9 wherein the command means of the microcomputer 4 commands the controller 16 such that the writing of the video signal in the memory 15 should be started and that the reading of the video signal from the memory 15 is terminated accordingly. Then, the routine proceeds to step ST-10 wherein the timer time is reset to zero by timer reset means of the microcomputer 4.

As set out above, even though the input video signal switching command is delivered to the microcomputer 4 from the key switch 5 or the remote commander 6, the switching operation of the input video signal is inhibited during the period in which the digital video signal is being written in the memory 15. The switching operation is carried out immediately after the completion of the writing of the digital video signal in the memory 15.

In the event that the time necessary for switching the input video signal falls within 7V, no trouble occurs. If it takes more than 7V, then the reading period of the memory 15 may be extended to be some suitable one, for example, 9V in accordance with the time necessary for the switching. In that case, regardless of the existence of the input video signal switching command during the period in which the picture is displayed in a strobe-action-fashion, the reading time of the memory 15 may be extended to be 9V. Alternatively, the reading time of the memory 15 may be varied to be 7V, such as is provided by the absence of the input video signal switching command or to be 9V, such as is provided by the existence of the input video signal switching command.

A proposal that can avoid the fluctuation of the image in the vertical direction in a strobe-display, which is another feature of the invention, will be described. The circuit arrangement that can realize the above proposal is the same as those shown in FIGS. 1 and 2.

According to the above proposal, when the digital video signal is written in the memory 15, the controller 16 responds to the control signal from the microcomputer 4 to control memory 15 such that the digital video signal is written in the memory 15 within one field period and then the writing is stopped (or frozen). In the memory 15, there is, therefore, stored a digital video signal of one field corresponding to the last odd or even field. In this case, one of the odd field and the even field is selected by the microcomputer 4. Consequently, one field of digital video signal of the odd or even field is read out of the memory 15, whereby a strobe-display image formed of, for example, seven still images is displayed on the color cathode ray tube 14. After the digital video signal is read from the memory 15 over a period of seven fields, one field of the digital video signal of the same odd or even field is again written in the memory 15 within one field period, thus resulting in a strobe-display image being displayed on the color cathode ray tube 14, similarly.

The operation of this embodiment, in particular, the operation in the period in which a picture is displayed in a strobe-action-fashion will be explained with reference to a flow chart of FIG. 4.

Figure 4:
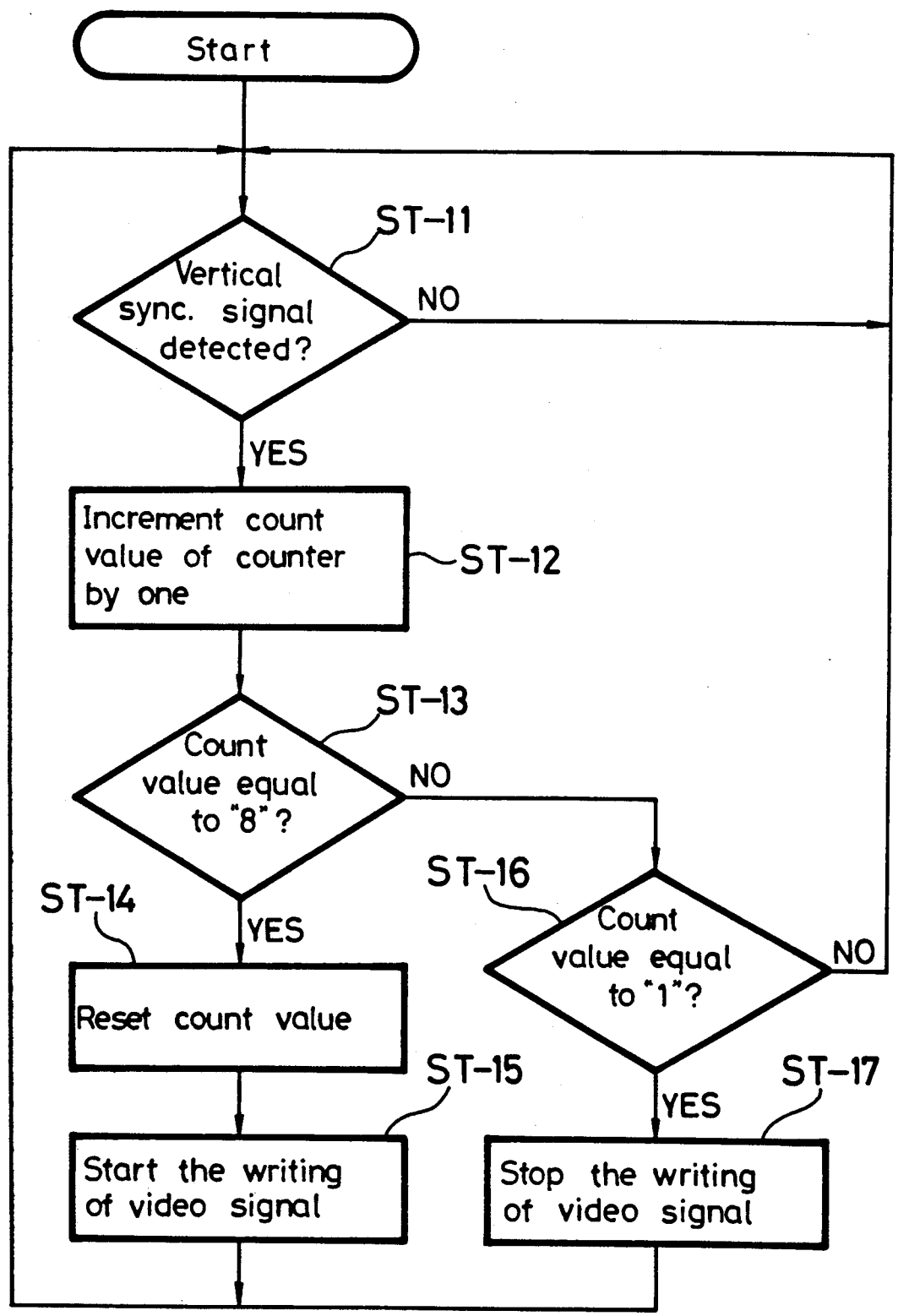
FIG. 4 is a flow chart to which reference will be made in explaining the operation of the embodiment shown in FIG. 1 relating to a second characteristic of the invention.

Referring to FIG. 4, initially in decision step ST-11, it is determined by vertical synchronizing signal detecting means of the microcomputer 4 whether the vertical synchronizing signal separated from the luminance signal Y by the Y/C separating circuit 10 is detected or not. If a YES is output at step ST-11, then the routine proceeds to step ST-12. If a NO is output at step ST-11, the routine returns to step ST-11.

In step ST-12, the count value of the counter (counter means) in the microcomputer 4 for counting the vertical synchronizing signal increments from zero by one in response to the vertical synchronizing signal. The counting of the vartical synchronizing signal may be started from either an odd or even field of the vertical synchronizing signal.

In the next decision step ST-13, it is determined by count value detecting means of the microcomputer 4 whether the count value of the counter is "8". If it is determined that the count value of the counter is "8", as represented by a YES at step ST-13, then the routine proceeds to step ST-14. If not, the routine proceeds to the next decision step ST-16.

At step ST-14, the counter is reset, or the count value of the counter is made "0" by counter control means of the microcomputer 4, and the routine then moves to step ST-15. In step ST-15, the command means of the microcomputer 4 commands the controller 16 such that the writing of the digital video signal (digital luminance signal and two color difference signals) in the memory 15 should be started and hence that the reading of the digital video signal from the memory 15 should be terminated (or frozen). Then, the routine returns to step ST-11.

In decision step ST-16, it is determined by the count value detecting means of the microcomputer 4 for detecting the count value of the counter whether the count value of the counter is "1". If so, the routine proceeds to step ST-17. If not, the routine returns to step ST-11.

In step ST-17, the command means of the microcomputer 4 commands the controller 16 such that the writing of the digital video signal in the memory 15 should be terminated (or frozen) and accordingly that the reading of the digital video signal from the memory 15 should be started. The routine then returns to step ST-11.

According to the television apparatus of the present invention as set out, since the odd or even field of the video signal stored in the memory 15 is fixed to either the odd or even field, it is possible to avoid the image from fluctuating in the vertical direction when the image is displayed in a strobe-action-fashion.

According to the present invention, it is possible to obtain a television apparatus in which even when the input video signal is switched in the display of an image in a strobe-action-fashion, the image displayed in the strobe-action-fashion can be prevented from being disturbed, the display of the image can be prevented from being interrupted and in which the strobe display of the image is not stopped. Further, according to the present invention, it is possible to provide a television apparatus which can prevent the image in the strobe action from fluctuating in the vertical direction. The first period of time can be at every 2nV where n represents 1, 2, 3 . . . and V represents a period of the vertical synchronizing signal of the video signal.

The image output from said memory means can be displayed on a cathode ray tube in a picture-in-picture fashion.

It should be understood that the above description is presented by way of example on the preferred embodiments of the invention and it will be apparent that many modifications and variations thereof could be effected by one with ordinary skill in the art without departing from the spirit and scope of the novel concepts of the invention so that the scope of the invention should be determined only by the appended claims.

I claim as my invention:

1. Television apparatus comprising:
    (a) switching means for selecting a plurality of input video signals;
    (b) memory means comprising a Random Access Memory for storing one of said plurality of input video signals selected by said switching means at a first speed;
    (c) first control means for controlling reading and writing timings of said video signal at said memory means, said first control means generating control signals composed of; a first control singal for writing at said first speed a still image of said video signal in said memory means within a first period of time during a predetermined period;
    a second control signal for stopping the writing of said still image of said video signal in said memory means; and a third control signal for repeatedly reading at said first speed said still image from said memory means during a second period of time which is longer than said first period of time;
    (d) second control means for controlling said switching means so as to generate a switching motion within said second period of time when said switching means receives a signal for selecting said video signal; and
    (e) displaying said output of said memory means at said first speed and wherein said apparatus operates in a single mode without a floppy disc.

2. Television apparatus according to claim 1, in which said switching means is a tuner for television signal and said switching motion represents a selecting television channel.

3. Television apparatus according to claim 1, in which said switching means is a switching circuit for selecting a video signal from a tuner in said television apparatus and a video signal from a peripheral system.

4. Television apparatus according to claim 1, in which said memory means is a frame memory formed of a random access memory, said still image is a frame picture of said video signal and said first period of time is a frame period of said video signal.

5. Television apparatus according to claim 1, in which said memory means is a field memory formed of a random access memory, said still image is a field picture of said video signal and said first period of time is a field period of said video signal.

6. Television apparatus comprising:
    (a) memory means comprising a random access memory for storing a field image of an input video signal at a first speed according to an interlaced scanning system;
    (b) control means for controlling reading at said first speed and writing at said first speed of said video signal in said memory means, said control means generating control signals composed of;

a first control signal for writing at said first speed said field image of said video signal in said memory means within a first period of time at every period 2nV where n represents 1, 2, 3, . . . and V represents a period of the vertical synchronizing signal of said video signal;

a second control signal for stopping the writing of said video signal in said memory means;

a third control signal for repeatedly reading at said field speed, said first image of said video signal from said memory means within a second period of time which is longer than said first period of time and displaying said image at said first speed and wherein said apparatus operates in a single mode without a floppy disc.

7. Television apparatus according to claim 1 or 6, in which an image output from said memory means is displayed as a strobe action which indicates that a still image is being displayed.

* * * * *